United States Patent [19]

Jacoff

[11] Patent Number: 4,748,746
[45] Date of Patent: Jun. 7, 1988

[54] RECOILABLE TAPE SHOCK ABSORBER

[75] Inventor: Daniel Jacoff, Mineola, N.Y.

[73] Assignee: Great Neck Saw Manufacturers, Inc., Mineola, N.Y.

[21] Appl. No.: 4,095

[22] Filed: Jan. 15, 1987

[51] Int. Cl.⁴ .......................... G01B 3/10; B65H 75/48
[52] U.S. Cl. ..................... 33/138; 242/84.8; 242/107.2
[58] Field of Search ................ 33/138; 242/848, 107.2

[56] References Cited

U.S. PATENT DOCUMENTS

| | | | |
|---|---|---|---|
| 3,905,114 | 9/1975 | Rutty | 33/138 |
| 4,142,693 | 3/1979 | Czerwinski | 33/138 |
| 4,153,996 | 5/1979 | Rutty | 33/138 |
| 4,479,617 | 10/1984 | Edwards | 33/138 |
| 4,603,481 | 8/1986 | Cohen et al. | 33/138 |

FOREIGN PATENT DOCUMENTS 1277486 6/1972 United Kingdom ................ 33/138

Primary Examiner—William D. Martin, Jr.
Attorney, Agent, or Firm—Stoll, Wilkie, Previto & Hoffman

[57] ABSTRACT

A tape measure having a recoilable tape mounted within a cartridge. The free end of the recoilable tape extends out of the mouth and has a finger-grip extending therefrom to permit the tape to be extended from within the cartridge through said mouth. A spring is mounted in the cartridge to permit the tape to be recoiled and retracted within the cartridge through said mouth and a shock absorber is located within the cartridge to absorb the shock of the retracting tape.

16 Claims, 1 Drawing Sheet

RECOILABLE TAPE SHOCK ABSORBER

The present invention is directed to an improved tape measure and, more particularly, to a tape measure which is automatically recoilable.

Recoilable tape measures have been popular for a number of years. In general, they include a wound metal strip with numbers on it, which comprises the tape, and a spring pressed means for maintaining the tape wound around a spool. The wound tape is in a cartridge and is adapted to be pulled out of the cartridge when it is to be used, means are provided for locking the tape in place in the extended position. When the lock is released, the tape will recoil itself and wind up automatically around the spool to be withdrawn within the cartridge.

The tape has a finger-grip extending from its front end which is substantially at right angles to the front end of the tape. When the tape is being recoiled, the finger-grip sometimes strikes the mouth of the tape housing with great force so that damage may occur either to the tape or to the housing, or to the spring mechanism which recoils the tape.

The present invention eliminates this problem and has for one of its objects the provision of an improved tape measure in which means are provided to prevent damage to the tape, to the housing, or to the spring mechanism.

Another object of the present invention is the provision of an improved tape having a shock absorber mechanism to absorb any shocks on the tape or the housing upon the recoil of the tape.

Another object of the present invention is the provision of an improved tape measure in which the force of the tape is dampened.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings forming a part of the specification, wherein.

Figure 1:
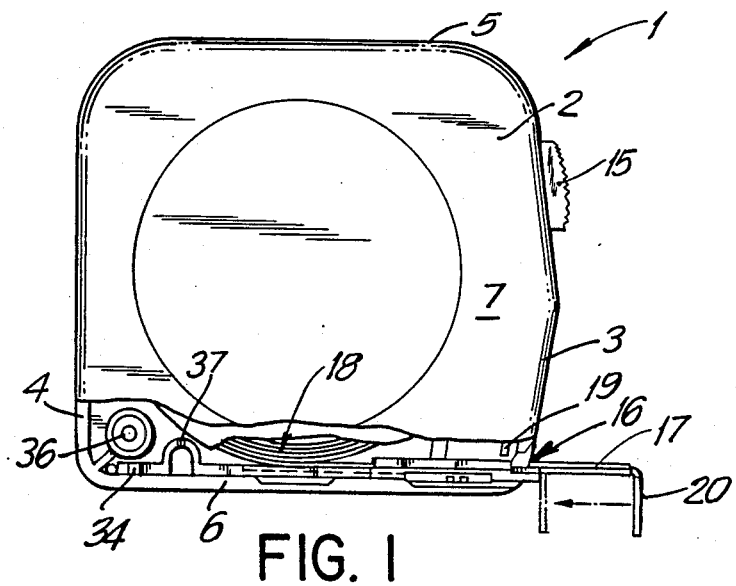
FIG. 1 is a side elevational view of a tape measure showing the present invention.
Figure 2:
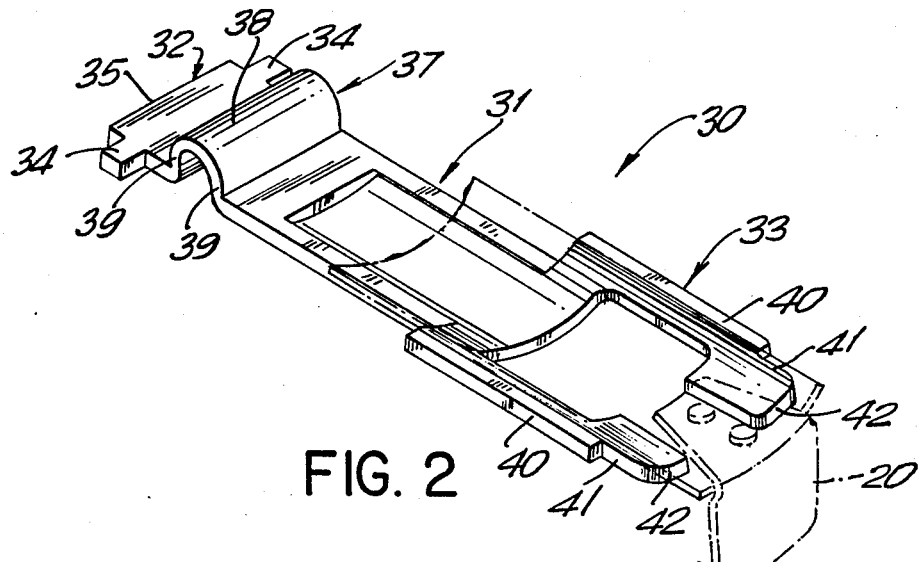
FIG. 2 is a top and front perspective view of the shock absorber used in the present invention.
Figure 3:
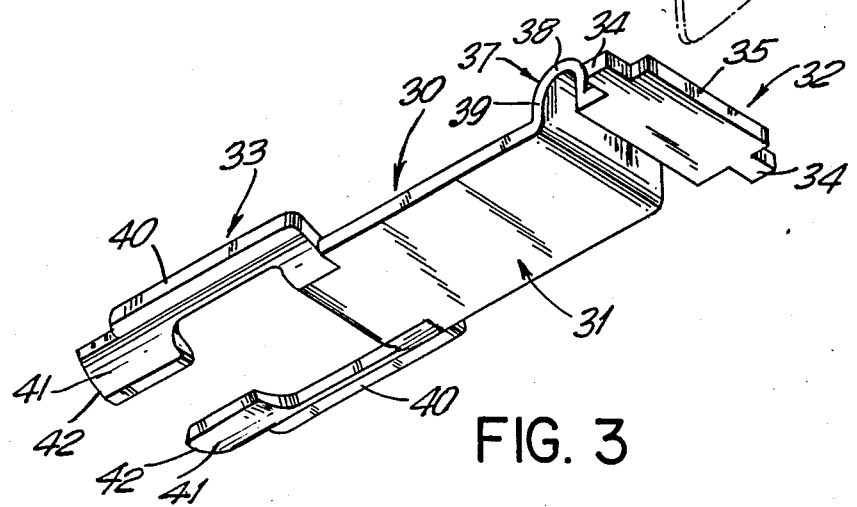
FIG. 3 is a bottom and rear perspective view of the shock absorber used in present invention.

The tape measure 1 of the present invention comprises an outer casing 2, having a front wall 3, a rear wall 4, a top wall 5, a bottom wall 6 and side walls 7. Preferably, the outer casing 2 is made of two matching half sections (not shown) which two half sections are adapted to mate with each other so that the front, rear, bottom and top walls 3, 4, 5 and 6, respectively, are completed.

A push button 15 is slidably mounted on front wall 3 and a mouth 16 is formed adjacent the lower edge of the front wall 3 through which a tape 17 protrudes.

The mouth 16 is downwardly concave to permit the tape 17 to assume a concave position. The tape 17 is wound on a spool 18 which is rotatably mounted within the cartridge with its forward end having a finger-grip 20 thereon extending from the mouth 16. A slide lock assembly 19 is slidably mounted within the cartridge adjacent the front wall 3. The slide lock assembly 19 is operatively connected to and controlled by the push butoon 15 and is adapted to move from a raised position to release the tape 17 to a lowered position to lock the tape 17 in place.

When the button 15 is depressed, the push button 15 will apply downward pressure to the slide 19 to move the slide 19 downwardly so that it strikes the extended tape 17 to press the tape against the mouth bottom 16 to hold the tape in place in its extended position.

When the tape is to be withdrawn, the push button 15 is raised so as to lift the slide 19 off the tape 17 to permit the tape to be withdrawn.

As will be apparent from the above, with the push button 15 in the raised position, the tape 17 is to be pulled out of the opening of the mouth 16 to wind up a spring (not shown) which controls the spool 18. When the desired length is reached, the push button 15 is depressed to permit the slide 19 to strike the tape 17 and press the tape against the lower mouth in order to hold the tape 17 in place. When it is desired to release the tape 17, the push button 15 is raised and the spring of the spool 18, which had been wound up, starts to unwind carrying the tape 17 with it and withdrawing it into the casing 2 through the mouth 16. The details of construction of a tape measure with which the present invention may be used is shown in U.S. Pat. No. 4,194,703.

As indicated hereinabove, the force of retraction sometimes causes the finger-grip 20 to strike the front wall 3 of the casing 2 so that the tape 17, the retraction spring, or the casing 2 may be damaged. In order to avoid this, a shock absorber assembly 30 is mounted on the bottom wall 6 of the casing 2. The shock absorber assembly 30 is made of any suitable material, such as a resilient plastic, and comprises a central body section 31, a rear anchoring section 32 extending rearwardly from the body portion 31 and front striker section 33 extending forwardly from the body portion 31. The transverse cross-section of the body portion 31 is in the shape of a concave arc in order to accommodate the concave figuration of the tape 17.

The rear anchoring section 32 has a pair of holding studs 34 extending from each side thereof and its rear edge 35 is adapted to be held in contact with a stop 36 formed in the cartridge (FIG. 1) to prevent longitudinal movement of the shock absorber assembly 30. The side studs are in contact with the casing to prevent transverse movement of the shock absorber assembly 30.

Interposed between the rear portion 32 and the main body portion 31 is a shock absorbing bridge 37 in the form of a U-shaped connecting portion 38 which extends upwardly above the plane of the main body portion 31 and comprises a pair of legs 39 which are integral with the rear section 32 and the main body portion 31. The shock absorbing assembly 37 is resilient so that the legs 39 may flex toward or away from each other.

The front striker section 33 comprises a pair of spaced absorber arms 40 extending forwardly from the body section 31 and concavely contoured in a similar manner. Striker points 41 are formed at their front ends which extend out of the front opening 16 of the casing 2. The striker points 41 are curved at its front edges 42 and are resilient in a transverse direction for purposes which will be further described hereinafter.

As seen in FIG. 1, the shock absorber assembly 30 lies on the bottom wall 6 of the casing 2 with the front striker points 41 of the shock absorbing arms 40 extending out of the front opening 16. In this position, the finger-grip 20 of the tape 17 lies in abutment with front edges 42 of the striker points 41. After the tape 17 is withdrawn from the casing 2, the measurement taken and tape 17 released for retraction with the casing 2, the finger-grip 20 will strike the front edges 42 of the striker tips 41. The tips 41 are resilient inwardly and the shock causes the arms 41 to move inwardly slightly to absosrb the force of the finger-grip 20 striking the striker tips 41. In addition, the force will cause the legs 39 of the rear shock absorbing bridge 37 to flex toward each other to absorb the longitudinal force of the retraction of the tape 17. Hence, the impact of the retracting tape will be absorbed by the shock absorber assembly 30 rather than by any other portion of the casing or tape in order to prevent damage either to the tape, the retracting spring, or to the casing.

It will be seen that the present invention provides an improved tape measure in which means are provided to prevent damage to the tape, to the housing, or to the spring mechanism, the means being in the form of a shock absorber mechanism to absorb any shocks on the tape or the housing upon the recoil of the tape, and in which the force of the tape in dampaned.

As many and varied modifications of the subject matter of this invention will become apparent to those skilled in the art from the detailed description given hereinabove, it will be understood that the present invention is limited only as provided in the claims appended hereto.

The embodiments of the invention in which an exclusive property or privilage is claimed are defined as follows:

1. A tape measure comprising a cartridge having a mouth, a recoilable tape having one end mounted within the cartridge, the free end of the recoilable tape extending out of the mouth, a fingergrip extending from the free end of the tape whereby the tape can be extended from within the cartridge through said mouth, spring means in the cartridge to cause the tape to be recoiled and retracted within the cartridge through said mouth, shock absorber means operatively associated with said cartridge to absorb the shock of the retracting tape, said shock absorber means comprising a body section and a shock absorber assembly, said shock absorber assembly comprising a U-shaped bridge, said shock absorber assembly having a rear anchor section and the U-shaped bridge being interposed between said rear anchor sectin and the body section.

2. A tape measure as set forth in claim 1 wherein shock absorber arms extend forwardly from the body portion.

3. A tape measure as set forth in claim 2 wherein said shock absorber arms are spaced apart from each other.

4. A tape measure as set forth in claim 3 wherein said shock absorber arms are provided with resilient front tips.

5. A tape measure as set forth in claim 4 wherein said front tips are curved.

6. A tape measure as set forth in claim 5 wherein said shock absorber means comprises a body section and a shock absorber member.

7. A tape measure as set forth in claim 6 wherein said shock absorber means comprises a U-shaped bridge.

8. A tape measure as set forth in claim 7 wherein the shock absorber assembly has a rear anchor section and wherein the U-shaped bridge is interposed between said rear anchor section and the body section.

9. A shock absorber for a tape measure comprising a body section and a shock absorber member, said shock absorber member comprising a U-shaped bridge, said shock absorber member having a rear anchor section, the U-shaped bridge being interposed between said rear anchor section and the body section.

10. A shock absorber as set forth in claim 9 wherein shock absorber arms extend forwardly from the body portion.

11. A shock absorber as set forth in claim 10 wherein said shock abosrber arms are spaced apart from each other.

12. A shock absorber as set forth in claim 11 wherein said shock absorber arms are provded with resilient front tips.

13. A shock absorber as set forth in claim 12 wherein said front tips are curved.

14. A shock absorber as set forth in claim 13 wherein said shock absorber means comprises a body section and a shock absorber member.

15. A shock absorber as set forth in claim 14 wherein said shock absorber means comprises a U-shaped bridge.

16. A shock absorber as set forth in claim 15 wherein the shock absorber assembly has a rear anchor section and wherein the U-shaped bridge is interposed between said rear anchor section and the body section.

* * * * *